(12) United States Patent
Shi et al.

(10) Patent No.: US 11,809,903 B2
(45) Date of Patent: Nov. 7, 2023

(54) MINI PROGRAM PROCESSING METHOD, APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Nansheng Shi, Beijing (CN); Malin Xie, Beijing (CN); Jiao Cao, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 332 days.

(21) Appl. No.: 17/207,935

(22) Filed: Mar. 22, 2021

(65) Prior Publication Data
US 2021/0208931 A1 Jul. 8, 2021

Related U.S. Application Data

(63) Continuation of application No. PCT/CN2020/105740, filed on Jul. 30, 2020.

(30) Foreign Application Priority Data

Mar. 13, 2020 (CN) .......................... 202010175889.2

(51) Int. Cl.
*G06F 9/48* (2006.01)
*G06F 16/248* (2019.01)
(Continued)

(52) U.S. Cl.
CPC .......... *G06F 9/4881* (2013.01); *G06F 9/5005* (2013.01); *G06F 11/3466* (2013.01); *G06F 16/248* (2019.01); *G06F 2209/508* (2013.01)

(58) Field of Classification Search
None
See application file for complete search history.

(56) References Cited

U.S. PATENT DOCUMENTS 8,468,164 B1 * 6/2013 Paleja ................. H04L 67/1097
708/805
10,264,083 B2    4/2019 Pang
(Continued)

FOREIGN PATENT DOCUMENTS

AU       2019100103 A4    3/2019
CA          2482082 A1    3/2005
(Continued)

OTHER PUBLICATIONS

First Office Action in KR Patent Application No. 10-2021-7008230 dated Sep. 25, 2022.
(Continued)

*Primary Examiner* — Qing Chen
(74) *Attorney, Agent, or Firm* — Dilworth IP, LLC

(57) ABSTRACT

The present application discloses a mini program processing method, an apparatus, a device, and a storage medium, which relates to the technical field of Internet, in particular to the technical field of information processing. The technical solution disclosed in the present application can be applied to a mini program service platform, the detail technical solution includes: through receiving a query service request initiated by a user, screening, according to at least one of the terminal parameter and the application category in the query service request, a set of mini program adapted to at least one of a terminal parameter and an application category of a terminal, issuing the set of mini programs to the terminal, the set of mini programs includes at least one mini program adapted to the terminal parameter and the application category.

19 Claims, 3 Drawing Sheets

(51) Int. Cl.
*G06F 9/50* (2006.01)
*G06F 11/34* (2006.01)

(56) References Cited

U.S. PATENT DOCUMENTS

| | | | |
|---|---|---|---|
| 10,296,309 B1* | 5/2019 | Mercille | G06F 8/38 |
| 2005/0102263 A1 | 5/2005 | Kemmoku | |
| 2008/0250115 A1* | 10/2008 | Iyer | G06Q 10/10 709/207 |
| 2010/0262619 A1 | 10/2010 | Zargahi et al. | |
| 2012/0284247 A1* | 11/2012 | Jiang | G06F 16/9535 707/706 |
| 2015/0301815 A1* | 10/2015 | Tervo | G06Q 20/326 717/178 |
| 2017/0215024 A1* | 7/2017 | Pang | H04L 67/34 |
| 2019/0227794 A1* | 7/2019 | Mercille | G06F 8/36 |

FOREIGN PATENT DOCUMENTS

| | | |
|---|---|---|
| CN | 101888416 A | 11/2010 |
| CN | 107179923 A | 9/2017 |
| CN | 107329778 A | 11/2017 |
| CN | 107426272 A | 12/2017 |
| CN | 108536486 A | 9/2018 |
| CN | 109033299 A | 12/2018 |
| CN | 110134394 A | 8/2019 |
| CN | 110209450 A | 9/2019 |
| CN | 110362248 A | 10/2019 |
| CN | 110377365 A | 10/2019 |
| CN | 110806975 A | 2/2020 |
| CN | 110865855 A | 3/2020 |
| CN | 111382362 A | 7/2020 |
| JP | 2006202028 A | 8/2006 |
| JP | 2013109403 A | 6/2013 |
| JP | 5949904 B2 | 7/2016 |
| JP | 2020024656 A | 2/2020 |
| WO | 2013146047 A1 | 10/2013 |
| WO | 2014054179 A1 | 4/2014 |
| WO | 2016099447 A1 | 6/2016 |
| WO | 2017017664 A1 | 2/2017 |

OTHER PUBLICATIONS

Notice of Allowance in JP Patent Application No. 2021-517417 dated Oct. 17, 2022.
First Office Action in CN Patent Application No. 202010175889.2 dated Feb. 11, 2023.
European Search Report in EP Patent Application No. 20862009.6 dated Apr. 4, 2022.
International Search Report in PCT/CN2020/105740 dated Dec. 14, 2020.
Notice of Reasons for Refusal in JP Patent Application No. 2021-517417 dated May 30, 2022.
Second Office Action in CN Patent Application No. 202010175889.2 dated Jun. 26, 2023, 13 pages.

* cited by examiner

MINI PROGRAM PROCESSING METHOD, APPARATUS, DEVICE AND STORAGE MEDIUM

CROSS-REFERENCE TO RELATED APPLICATION

This application is a continuation of International Application PCT/CN2020/105740, filed on Jul. 30, 2020, which claims the priority of Chinese patent application No. 202010175889.2, entitled "Mini Program Processing Method, Apparatus, Device and Storage Medium" filed to the China National Intellectual Property Administration on Mar. 13, 2020, both of which are incorporated herein by reference in their entirety.

TECHNICAL FIELD

The present application relates to the technical field of information processing in the technical field of Internet, and more particular, to a mini program processing method, an apparatus, a device, and a storage medium.

BACKGROUND

With the continuous advancement of mobile Internet technology, in order to reduce development costs and improve the utilization efficiency of vertical or long tail traffic, major application platforms introduce mini program development technology. Mini program is application that may be issued from a server and executed in a specific container without installation. For example, a user may complete one-stop services such as information, shopping, listening to music, and watching movies through a mini program on a certain application without opening a new application.

With the explosive growth of the mini program, the task of distributing mini program has become very difficult. At present, the distribution of mini program is mainly through business scenario user (such as application developer) pulling out all the mini program submitted by developer, and then perform screening based on business scenario, supplemented by manual calibration, to complete the distribution process of mini program.

However, since the above distribution process requires manual selection, different subjective factors will present different distribution results, and the labor cost is high. In addition, it is often impossible to synchronize the latest mini program package in time by pulling or manually screening, and the timeliness is poor.

SUMMARY

The present application provides a mini program processing method, an apparatus, a device, and a storage medium for improving the efficiency and accuracy of mini program issuance.

In a first aspect, the present application provides a mini program processing method, including:
receiving a query service request initiated by a user through a terminal, where the query service request includes at least one of the following: a terminal parameter or an application category; screening a first set of mini programs adapted to the terminal through the query service request; and issuing the first set of mini programs to the terminal, the first set of mini programs includes at least one mini program adapted to the terminal parameter or the application category.

In a possible implementation manner, the screening a first set of mini programs adapted to the terminal through the query service request includes: screening a first set of mini programs adapted to the terminal parameter of the terminal through the terminal parameter in the query service request; or, screening a first set of mini programs adapted to the application category of the terminal through the application category in the query service request; or, screening a candidate set of mini programs adapted to the terminal parameter of the terminal through the terminal parameter in the query service request, and screening a first set of mini programs adapted to the application category of the terminal from the candidate set of mini programs.

In a possible implementation manner, before the issuing the first set of mini programs to the terminal, the method further includes: acquiring a historical operation status of each mini program in the first set of mini programs; screening at least one mini program that satisfies a preset operation status, from the first set of mini programs, according to the historical operation status; correspondingly, the issuing the first set of mini programs to the terminal includes: issuing at least one mini program in the first set of mini programs that satisfies the preset operation status to the terminal.

In a possible implementation manner, the acquiring a historical operation status of each mini program in the first set of mini programs includes: acquiring a historical operation status of each mini program by querying a user behavior log of each mini program in different terminals or different applications.

Optionally, the historical operation status is used to indicate at least one of the number of exception occurrence, an average usage frequency, and an average usage duration of a mini program.

Correspondingly, satisfying the preset operation status includes at least one of the following: the number of exception occurrence of the mini program is less than a first preset number of times; the average usage frequency of the mini program is greater than or equal to a preset usage frequency; the average usage duration of the mini program is greater than or equal to preset usage duration.

In a possible implementation manner, before the issuing the first set of mini programs to the terminal, the method further includes: acquiring a real machine verification result of each mini program in the first set of mini programs; screening at least one mini program that satisfies a preset verification condition from the first set of mini programs according to the real machine verification result; correspondingly, the issuing the first set of mini programs to the terminal includes: issuing at least one mini program in the first set of mini programs that satisfies the preset verification condition to the terminal.

Optionally, the real machine verification result is used to indicate at least one of the number of exception occurrence and average initiation duration of the mini program.

Correspondingly, satisfying the preset verification condition includes at least one of the following:
the number of exception occurrence is less than a second preset number of times, and the average initiation duration is less than a preset initiation duration.

Optionally, the terminal parameter includes at least one of the following: type, model, screen size, resolution, aspect ratio adapted to a mini program, and supported function of the terminal.

Optionally, the supported function includes at least one of the following: Bluetooth function, global positioning system GPS function, video function, and audio function.

Optionally, the application category includes any one of the following: social application, navigation application, wealth management application, shopping application, video application, game application, and photography application.

In a possible implementation manner, before the receiving a query service request of a terminal, the method further includes: acquiring a mini program data package and first configuration information of the mini program data package, the first configuration information is used to indicate a terminal parameter and/or an application category adapted to the mini program; storing the first configuration information.

In a possible implementation manner, after the acquiring a mini program data package and first configuration information of the mini program data package, the method further includes: acquiring a real machine verification result of the mini program in different terminals or different applications; storing the real machine verification result.

In a possible implementation, the method includes: acquiring an update data package of a mini program and second configuration information of the update data package, the second configuration information is used to indicate a terminal parameter and/or application category adapted to the updated mini program; transmitting the update data package to a terminal that has been issued the mini program according to the second configuration information.

In a possible implementation manner, the transmitting the update data package to a terminal that has been issued the mini program according to the second configuration information includes: determining a first terminal which matches the update terminal parameter by comparing a terminal parameter of each terminal in historical issuance record with an updated terminal parameter indicated by the second configuration information; transmitting the update data package to the first terminal.

In a possible implementation manner, the transmitting the update data package to a terminal that has been issued the mini program according to the second configuration information includes: putting a tag on the update data package if a terminal that has been issued the mini program does not match a terminal parameter adapted to the mini program, the tag is used to indicate that the terminal does not adapt to the mini program; transmitting the update data package including the tag to the terminal.

In a second aspect, the present application provides a mini program processing apparatus, including:
a receiving module, configured to receive a query service request initiated by a user through a terminal, where the query service request includes at least one of the following: a terminal parameter or an application category; a processing module, configured to screen a first set of mini programs adapted to the terminal through query service request; and a transmitting module, configured to issue the first set of mini programs to the terminal, the first set of mini programs including at least one mini program adapted to the terminal parameter or the application category.

In a third aspect, the present application provides an electronic device, including:
at least one processor; and
a memory communicatively connected with the at least one processor;
where the memory stores instructions which are executable by the at least one processor, the instructions are executed by the at least one processor, so that the at least one processor can execute the method according to any one of the first aspect.

In a fourth aspect, the present application provides a non-transitory computer-readable storage medium storing computer instructions, the computer instructions is used to cause a computer to execute the method according to any one of the first aspect.

In a fifth aspect, the present application provides a mini program processing method, including:
receiving a query service request initiated by a user through a terminal;
screening a first set of mini program adapted to the terminal through the query service request; transmitting the first set of mini programs to the terminal, the first set of mini programs including at least one mini program adapted to the terminal.

The present application provides a mini program processing method, an apparatus, a device, and a storage medium, which relates to the technical field of Internet, in particular to the technical field of information processing. The technical solution disclosed in the present application can be applied to a mini program service platform, the technical solution includes: screening a set of mini program adapted to at least one of a terminal parameter and an application category of a terminal, by receiving a query service request initiated by a user, according to at least one of the terminal parameter and the application category in the query service request, issuing the set of mini programs to the terminal, the set of mini programs includes at least one mini program adapted to the terminal parameter and the application category. The above processing procedure realizes the intelligent screening and issuance ability, which improves the issuance efficiency on the one hand, and also improves the issuance accuracy on the other hand, so that user may acquire and use a terminal-adapted mini program in time.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF DRAWINGS

The accompanying drawings are used to better understand the solution and do not constitute a limitation to the present application. Among them.

DESCRIPTION OF EMBODIMENTS

Figure 1:
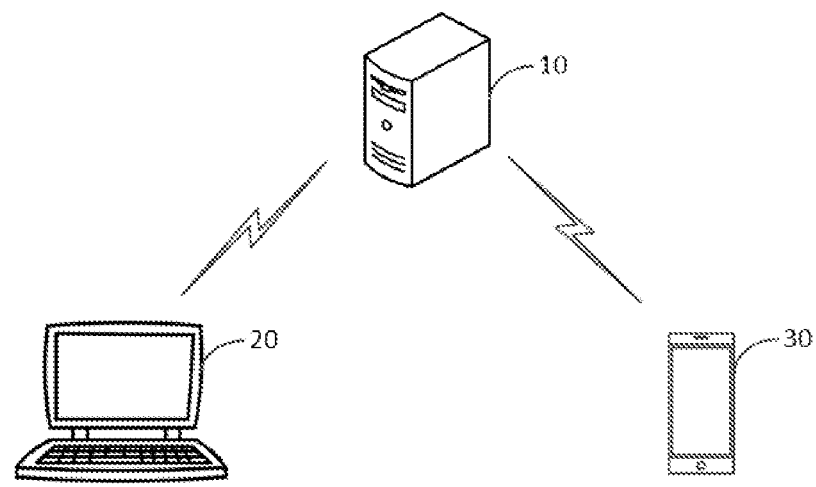
FIG. 1 is a schematic diagram of an application scenario provided by an embodiment of the present application.

The exemplary embodiments of the present application are described below in conjunction with the accompanying drawings, which include various details of the embodiments of the present application to facilitate understanding, and should be regarded as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

With the rapid growth of mini programs, applications and products developed around mini programs have received constant attention. For example, a user may navigate to destinations through a map mini program on a car control terminal, and may also shopping through the shopping mini program on a voice box with screen, and may also complete services such as information query, listening to music, and watching video by different types of mini programs on a searching application, a user does not need to open a new application.

Application mini programs of so many scenarios not only bring great convenience to users, but also bring traffic dividends to developers. Facing with many application scenarios, how to ensure that the mini program is well adapted to different terminals or different applications, and how to ensure that the mini program that meets the specific scenario is timely and accurately issued to a designated terminal has become an urgent problem to be solved.

At present, there is no similar technology or implementation scheme in the industry. Conventional mini program distribution is mainly pulling out the distributable mini program submitted by developer through a business scenario user, and then performing screening based on the business scenario, and verifying in its own business scenario supplemented by manual calibration. Or, simply selecting some mini programs as pilot, and continuing to select appropriate mini programs after the pilot is successful. For example, searching application mainly provide user with information and news query services, mini program that meets this business scenario may be express mini program, legal consulting mini program, knowledge database mini program, etc., searching application developer may target on pulling out related mini program for verification, and select appropriate mini program for release.

The main problems in the above distribution process are: 1) too subjective: since manual selection is required, different subjective factors often lead to different distribution results. 2) poor timeliness: it is often impossible to synchronize the latest mini program packages in time by pulling method or manual screening method, and a service platform may not timely issue notification of updating data package. 3) higher cost: change of the mini program package on the platform requires the business side to verify adaptation status by itself, which leads to an increase in labor costs. 4) poor user experience: due to the incomplete manual screening, cause the developer failed to issue the originally matched mini programs to the user, and the user could not enjoy the convenience brought by part of the mini programs.

In order to solve the above problems, the embodiments of the present application provide a mini program processing method. The processing method involves three aspects: the first aspect is the improvement of mini program submission process, a developer submits a mini program while selecting a terminal or an application that needs to be placed, presetting relevant parameters for automatic distribution of subsequent mini programs. The second aspect is an intelligent issuance process of the mini program, a server may trigger the issuance process through a request initiated by a user, and may also actively issue the mini program to the terminal or the application. The third aspect is an update process of a mini program data package, the server may issue the updated mini program data package according to the historical configuration parameters and the updated configuration parameters of the mini program to ensure that current matched terminal or application may synchronize the mini program data package in time. The processing method provided by the embodiments of the present application realizes the intelligent distribution of the mini program, and may timely and accurately issue the matched mini program to the terminal or the application, so that the user may enjoy the convenience brought by the mini program for the first time and improve user experience.

FIG. 1 is a schematic diagram of an application scenario provided by an embodiment of the present application. As shown in FIG. 1, the application scenario includes a server 10, a terminal device 20, and a terminal device 30, where, the server is connected to the terminal device 20 and the terminal device 30 through a wired network or a wireless network. A developer may log into the server 10 through a client on the terminal device 20, and may submit a mini program data package and configuration information of the mini program data package to the server 10. The server may automatically issue the mini program data package to the terminal device 30 matched to the configuration information according to the configuration information, or, may issue the mini program data package matched to the terminal device 30 to the terminal 30, according to a query service request initiated by a user through the terminal device 30.

The technical solution of the present application will be described in detail below in conjunction with several specific embodiments. The following embodiments may be combined with each other, and descriptions of the same or similar content may not be repeated in some embodiments.

Figure 2:
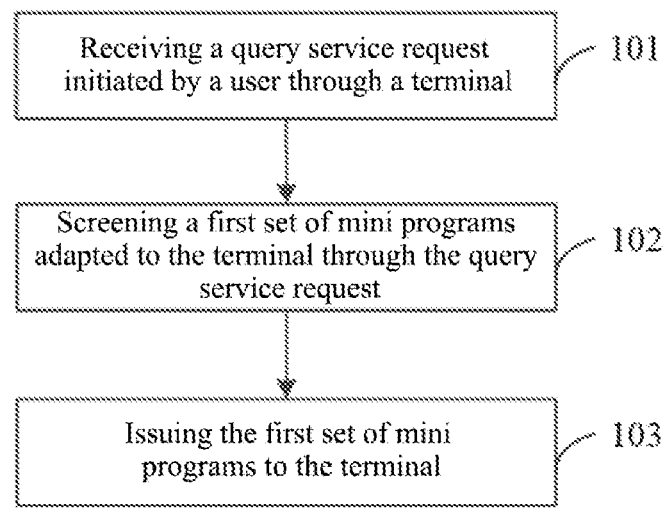
FIG. 2 is a schematic flowchart of a mini program processing method provided by an embodiment of the present application.

FIG. 2 is a schematic flowchart of a mini program processing method provided by an embodiment of the present application. The method of the present embodiment may be executed by the server shown in FIG. 1. As shown in FIG. 2, the method of the embodiment includes the following steps:

Step 101: receiving a query service request initiated by a user through a terminal.

Among them, the query service request includes at least one of the following: a terminal parameter or an application category.

In the embodiment, the terminal parameter includes at least one of the following: type, model, screen size, resolution, aspect ratio adapted to a mini program, and supported function of the terminal.

Among them, the type of terminals includes smart phone, voice box with or without screen, smart watch, on-board terminal, smart refrigerator with screen, smart TV, smart dressing mirror, and etc. The model of the terminal includes product model and production serial number of the terminal, and etc. The aspect ratio for adapting mini program refers to the aspect ratio of the mini program window supported by the terminal that can be scaled. The supported function includes at least one of the following: Bluetooth function, GPS function, video function, audio function.

In the embodiment, the application category includes any one of the following: social application, navigation application, wealth management application, shopping application, video application, game application, and photography application. It should be understood that different application categories correspond to different business scenarios, and there are differences in the mini programs that can be supported or extended in different application categories. For example, other mini program of mini-game is added to the game application, and shopping mini program is added to the wealth management application.

Optionally, the query service request may also include the following parameters: current network status of a terminal (e.g., 3G, 4G, 5G, etc.), request type (e.g., http, https, etc.), encryption method (e.g., RSA asymmetric encryption, etc.), system agreed parameter, random code, etc. Among them, the system agreed parameter and the random code are used for security verification.

As an example, Table 1 shows the key information of the query service request sent by a terminal to a server. The request specifically includes a protocol header and protocol body.

TABLE 1

| Parameters | Description |
| --- | --- |
| header | Including following information:<br>(a) Terminal type<br>(b) Current network status<br>(c) Request type<br>(d) Encryption method<br>(e) System agreed parameter<br>(f) Random code |
| body | Including but not limited to following information:<br>(a) Screen size and resolution<br>(b) Support Bluetooth or not<br>(c) Support GPS or not<br>(d) Support playing video and audio or not<br>(e) Terminal model<br>(f) Aspect ratio for adapting mini program<br>(g) Application scenario |

In Table 1, whether a terminal supports Bluetooth, GPS, video, and audio or not may be determined by identification. For example, 0 indicates that a certain capability is not supported, and 1 indicates that a certain capability is supported. The application scenario in Table 1 represents a business scenario adapted (or matched) to the mini program, such as shopping scenario, game scenario, chat scenario, navigation scenario, video playback scenario, audio playback scenario, etc. The application scenarios here correspond to the above application categories.

Step 102: screening a first set of mini programs adapted to the terminal through the query service request.

In the embodiment, the screening a first set of mini programs adapted to the terminal through the query service request includes the following implementation manners:

In a possible implementation manner, screening a first set of mini programs adapted to a terminal parameter of the terminal through a terminal parameter in the query service request. Exemplarily, the query service request includes types of the terminal, such as a voice box with a screen, and a server screens a first set of mini programs that are adapted to the voice box with a screen from a set of mini programs. Exemplarily, the query service request includes an aspect ratio of the mini program adapted to a terminal, such as 135:120, and a server screens a first set of mini programs with the aspect ratio of 135:120 from a set of mini programs. It should be noted that, if the query service request includes multiple terminal parameters, a server should screen a first set of mini programs that meets multiple terminal parameters at the same time from a set of mini programs.

In a possible implementation manner, screening a first set of mini programs adapted to an application category of the terminal through an application category in the query service request. Exemplarily, the query service request includes the category of the application currently opened by a user on a terminal, such as a shopping application, that is, the current application scenario is a shopping scenario, a server screens a first set of mini programs adapted to the shopping scenario from a set of mini programs. It should be understood that there are differences in the categories of mini programs that can be expanded in different application scenarios.

In a possible implementation manner, screening a candidate set of mini programs adapted to the terminal parameter of the terminal through the terminal parameter in the query service request, and screening a first set of mini programs adapted to the application category of the terminal from the candidate set of mini programs. This implementation manner combines the above first and second implementation methods, the query service request transmitted by the terminal includes not only the terminal parameter but also the category of the application currently run on the terminal, so as to realize the accurate issuance of mini program for a specific application scenario of a certain terminal.

Optionally, on the basis of any one of the foregoing implementation manners, further screens a first set of mini program sets, combined with the historical operation status or the real machine verification result of each mini program in the first set of mini programs. Specifically include the following two cases.

In the first case, before a server issues a first set of mini programs to a terminal, it further includes the following steps: acquiring a historical operation status of each mini program in the first set of mini programs; screening at least one mini program that satisfies a preset operation status, from the first set of mini programs, according to the historical operation status; accordingly, the issuing the first set of mini programs to the terminal includes: issuing at least one mini program in the first set of mini programs that satisfies the preset operation status to the terminal.

Specifically, a server may acquire a historical operation status of each mini program by querying a user behavior log of each mini program in different terminals or different applications.

The historical operation status is used to indicate at least one of the number of exception occurrence, an average usage frequency, and average usage duration of a mini program. Among them, the average usage frequency refers to the average usage frequency of all users who use the mini program, and the usage frequency may be defined as the average number of times the mini program is used per day (or weekly, or monthly, etc.). The average usage duration refers to the average usage duration of all users each time using the mini program.

Correspondingly, satisfying the preset operation status includes at least one of the following:
the number of exception occurrence of the mini program is less than a first preset number of times;
the average usage frequency of the mini program is greater than or equal to a preset usage frequency;
the average usage duration of the mini program is greater than or equal to preset usage duration.

It should be noted that for mini programs that have been issued to other terminals, the entire process from issuance to startup and completion of the mini program should be as free as possible from exceptions and errors, a server may evaluate the stability of the mini program by counting the number of exception occurrence of the mini program in execution. In addition, the server may also evaluate the popularity of the mini program by counting the average usage frequency and the average usage duration of the mini program that has been issued to other terminals. The stability and popularity of the mini program may be used as a screening indicator for a set of mini programs issued by the server, that is, the server issues a set of mini programs that are compatible with the terminal and have a certain stability and popularity to the terminal according to the query service request of the terminal, so as to further improve the intelligent issuance capability of the server.

In the second case, before a server issues a first set of mini programs to a terminal, it further includes the following steps: acquiring a real machine verification result of each mini program in the first set of mini programs; screening at least one mini program that satisfies a preset verification condition from the first set of mini programs according to the real machine verification result; correspondingly, the issuing the first set of mini programs to the terminal includes: issuing at least one mini program in the first set of mini programs that satisfies the preset verification condition to the terminal.

Specifically, the real machine verification result is used to indicate at least one of the number of exception occurrence and average initiation duration of the mini program. Among them, the average initiation duration refers to the average initiation duration of a mini program in all test simulators, the test simulators include terminal devices of different terminal types or different terminal models.

Correspondingly, satisfying the preset verification condition includes at least one of the following: the number of exception occurrence is less than a second preset number of times, and the average initiation duration is less than preset initiation duration.

The abnormal situation of a mini program includes mini program freeze, flashback, and white screen, etc. If any of the above abnormal situations occurs during the execution of the mini program, the number of exceptions is increased by one, a server counts the number of exception occurrence of the mini program during a real-machine verification process. If the number of exception occurrence is greater than the second preset number of times, it indicates that the mini program is not adapted to the current terminal or application.

The startup duration refers to an opening time of a mini program on a first screen. If the opening time is too long, the mini program does not adapt to the current terminal or application.

It should be noted that the real machine verification is performed after a developer uploads a mini program data package or a mini program update data package. A server performs real machine verification on different terminals by parsing the mini program data package (or mini program update data package) and configuration information of the mini program data package, monitoring the number of exception occurrence and startup duration of the mini program on the real machine, finally writing back a verification result in combination with manual-assisted spot check and verification to provide a screening basis for a server to issue a set of mini programs.

Step 103: issuing the first set of mini programs to the terminal, the first set of mini programs includes at least one mini program adapted to a terminal parameter or an application category.

Optionally, if a server determines that there is no mini program adapted to a terminal parameter or an application of the terminal, the server returns a query request response to the terminal, the response is used to indicate that there is no mini program adapted to the terminal currently.

In the embodiment, automatically screening a set of mini programs adapted to a terminal parameter and/or an application category from a server, by the terminal parameter and/or application category in the query service request, so as to realize the automation process of screening and issuing of mini program set, which greatly saves labor costs. Compared with manual screening, the accuracy of issuing mini program set is higher, which provides convenience for user in mini program usage.

The mini program processing method provided in the embodiment, screening a set of mini program adapted to at least one of a terminal parameter and an application category of a terminal, by receiving a query service request initiated by a user, according to at least one of the terminal parameter and the application category in the query service request, issuing the set of mini programs to the terminal, the set of mini programs includes at least one mini program adapted to the terminal parameter and the application category. The above processing procedure realizes the intelligent screening and issuance ability, which improves the issuance efficiency on the one hand, and also improves the issuance accuracy on the other hand, so that user may acquire and use a terminal-adapted mini program in time.

Figures 3, 4:
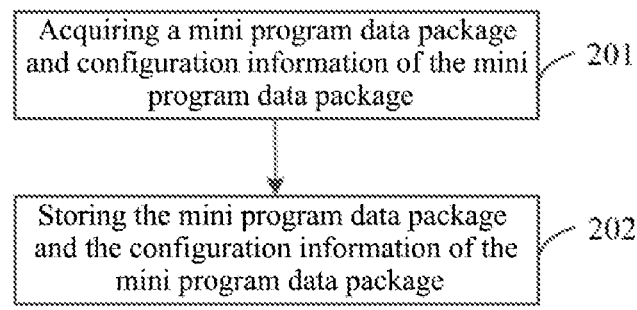
FIG. 3 is a schematic flow chart of a mini program processing method provided by an embodiment of the present application.
FIG. 4 is a schematic diagram of a mini program submission interface provided by an embodiment of the present application.

FIG. 3 is a schematic flow chart of a mini program processing method provided by an embodiment of the present application. The embodiment further refines the embodiment shown in FIG. 2. In the embodiment, before receiving a query service request of a terminal, a server also acquires pre-configuration information for the mini program by a developer and a machine verification result of the mini program by a developer. Among them, the pre-configured information and the real machine verification result provide a theoretical basis for the intelligent screening and issuing of the server.

The execution body of the embodiment is still the server shown in FIG. 1. As shown in FIG. 3, the method of the embodiment includes the following steps:

Step 201: acquiring a mini program data package and first configuration information of the mini program data package, the first configuration information is used to indicate a terminal parameter and/or an application category adapted to the mini program.

In the embodiment, a server provides a mini program submission interface for a developer. FIG. 4 shows a schematic diagram of a mini program submission interface. As shown in FIG. 4, a developer may submit a mini program data package or update package of mini program data package through an uploading control 302 on a mini program submission interface 301. The developer may also submit various terminal parameters and application categories (i.e. configuration information) adapted to the mini program through a various selecting controls 303 or a filling in control 304 on the mini program submission interface 301. For example, selecting the current network status (select "3G", "4G", "5G", etc.) of the terminal through the selecting control 303, and selecting whether to support Bluetooth, GPS, video, and audio or not (select "Yes", "No") through the selecting control 303.

Step 202: storing the first configuration information.

Optionally, after acquires a mini program data package and a first configuration information of the mini program data package, a server further acquires a real machine verification result of the mini program in different terminals or different applications, and stores the real machine verification result.

The above real machine verification process incorporates manual testing, and its purpose is to ensure the high quality of mini program issuance and ensure that a mini program submitted by a developer may be displayed and run normally in different terminals or different applications.

Figure 5:
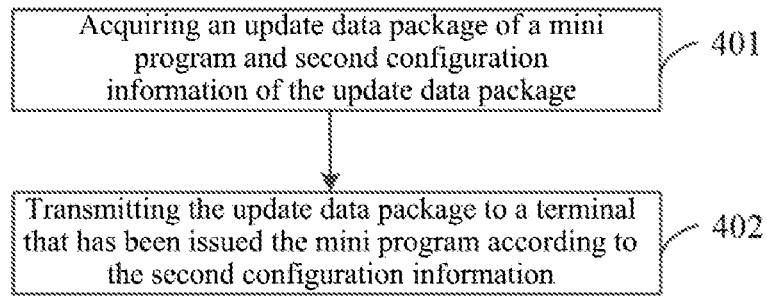
FIG. 5 is a schematic flowchart of a mini program processing method provided by an embodiment of the present application.

FIG. 5 is a schematic flowchart of a mini program processing method provided by an embodiment of the present application. The embodiment further refines the embodiment shown in FIG. 2. In the embodiment, after issues a set of mini programs, a server may receive an update package of a mini program in the set of mini programs. Whether the server timely and accurately processes the update package of the mini program or not will directly affect the user experience.

The execution body of the embodiment is still the server shown in FIG. 1. As shown in FIG. 5, the method of the embodiment includes the following steps:

Step 401: acquiring an update data package of a mini program and second configuration information of the update data package.

Among them, the second configuration information is used to indicate a terminal parameter and/or application category adapted to the updated mini program.

As an example, a terminal parameter adapted to an updated mini program may change, such as adding a certain type of adapted terminal, deleting a previously adapted screen parameter, etc.

As another example, a terminal parameter adapted to an updated mini program may change, such as adding the number of application category adapted to the mini program, adding navigation application which is previously not adapt to the adapted application category.

Step 402: transmitting the update data package to a terminal that has been issued the mini program according to the second configuration information.

In the embodiment, the transmitting the update data package to a terminal that has been issued the mini program according to the second configuration information includes the following two possible implementation manners:

In a possible implementation manner, determining a first terminal which matches the update terminal parameter by comparing a terminal parameter of each terminal in historical issuance record with an updated terminal parameter indicated by the second configuration information; transmitting the update data package to the first terminal.

Exemplarily, it is assumed that a smart watch in a historical issuance record is adapted to a mini program A, configuration information of an update data package of the mini program A deletes a terminal parameter of which a terminal type is a smart watch. A server determines a first terminal which matches an update terminal parameter by comparing the terminal parameter of each terminal in historical issuance record with the updated terminal parameter indicated by configuration information of the current update data package. The first terminal no longer includes the terminal whose terminal type is a smart watch, that is, the smart watch will not receive the update data package issued by the server.

In a possible implementation, putting a tag on the update data package, if a terminal that has been issued the mini program does not match a terminal parameter adapted to the mini program, the tag is used to indicate that the terminal does not adapt to the mini program; transmitting the update data package including the tag to the terminal.

The difference from the first implementation is that in this implementation, a server still transmits update data package to a terminal that has been issued a mini program, but for terminals that are no longer adaptable, the server will put a tag on the update data package before sending it. It is used to remind a terminal that the latest data package does not need to be updated when issuing, and the terminal can delete a locally injected mini program data package as appropriate.

Optionally, the issuing process of the embodiment may also consider the current network status of a terminal, and may adopt methods such as WIFI adaptive silent issuance, non-WIFI prompt update, etc. Specifically, the issuance may be performed according to a method preset on the terminal by a user, and the server does not impose any restrictions on the issuance method.

Figure 6:
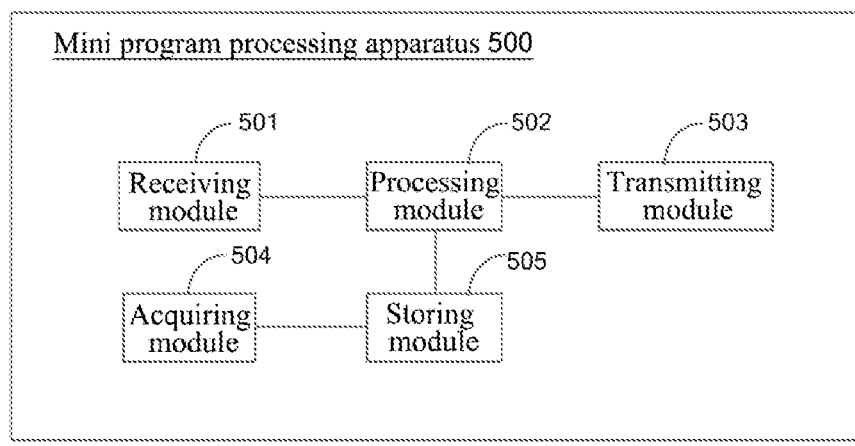
FIG. 6 is a schematic structural diagram of a mini program processing apparatus provided by an embodiment of the present application.

FIG. 6 is a schematic structural diagram of a mini program processing apparatus provided by an embodiment of the present application. The mini program processing apparatus of the embodiment may be set in a mini program server (mini program service platform). In some examples, the mini program processing apparatus of the embodiment may also be independent of the mini program server, communicate with the mini program server, and only realize the task of mini program issuance.

As shown in FIG. 6, a mini program processing apparatus 500 of the embodiment may include: a receiving module 501, a processing module 502, and a transmitting module 503.

Among them, the receiving module 501 is configured to receive a query service request initiated by a user through a terminal, where the query service request includes at least one of the following: a terminal parameter or an application category;

the processing module 502 is configured to screen a first set of mini programs adapted to the terminal through the query service request;

the transmitting module 503 is configured to issue the first set of mini programs to the terminal, the first set of mini programs includes at least one mini program adapted to the terminal parameter or the application category.

In a possible implementation manner, the processing module 502 is specifically configured to:

screen a first set of mini programs adapted to the terminal parameter of the terminal through the terminal parameter in the query service request; or, screen a first set of mini programs adapted to the application category of the terminal through the application category in the query service request; or, screen a candidate set of mini programs adapted to the terminal parameter of the terminal through the terminal parameter in the query service request, and screen a first set of mini programs adapted to the application category of the terminal from the candidate set of mini programs.

In a possible implementation manner, before the transmitting module 503 issues the first set of mini programs to the terminal, an acquiring module 504 is further configured to:

acquire a historical operation status of each mini program in the first set of mini programs;

the processing module 502 is further configured to screen at least one mini program that satisfies a preset operation status, from the first set of mini programs, according to the historical operation status;

correspondingly, the transmitting module 503 is configured to issue at least one mini program in the first set of mini programs that satisfies the preset operation status to the terminal.

In a possible implementation manner, the acquiring module 504 is specifically configured to acquire a historical operation status of each mini program by querying a user behavior log of each mini program in different terminals or different applications.

Optionally, the historical operation status is used to indicate at least one of the number of abnormal occurrences of the mini program, the average frequency of use, and the average duration of use;

correspondingly, satisfying the preset operation status includes at least one of the following:

the number of exception occurrence of the mini program is less than a first preset number of times;

the average usage frequency of the mini program is greater than or equal to a preset usage frequency;

the average usage duration of the mini program is greater than or equal to preset usage duration.

In a possible implementation manner, before the transmitting module 503 issues the first set of mini programs to the terminal, an acquiring module 504 is further configured to:

acquire a real machine verification result of each mini program in the first set of mini programs;

the processing module 502 is further configured to screen at least one mini program that satisfies a preset verification condition from the first set of mini programs according to the real machine verification result;

correspondingly, the transmitting module 503 is configured to issue at least one mini program in the first set of mini programs that satisfies the preset verification condition to the terminal.

Optionally, the real machine verification result is used to indicate at least one of the number of abnormalities in the mini program and the average startup time;

Correspondingly, satisfying the preset verification condition includes at least one of the following:

the number of exception occurrence is less than a second preset number of times, and the average initiation duration is less than a preset initiation duration.

Optionally, the terminal parameter includes at least one of the following: type, model, screen size, resolution, aspect ratio adapted to a mini program, and supported function of the terminal.

Optionally, the supported function includes at least one of the following: Bluetooth function, global positioning system GPS function, video function, and audio function.

Optionally, the application category includes any one of the following:

social application, navigation application, wealth management application, shopping application, video application, game application, and photography application.

In a possible implementation manner, before the transmitting module 503 receives a query service request of a terminal, the acquiring module 504 is further configured to:

acquire a mini program data package and first configuration information of the mini program data package, the first configuration information is used to indicate a terminal parameter and/or an application category adapted to the mini program;

a storing module 505 is configured to store the first configuration information.

In a possible implementation manner, after acquires a mini program data package and first configuration information of the mini program data package, the method further includes, the acquiring module 504 is further configured to:

acquire a real machine verification result of the mini program in different terminals or different applications;

the storing module 505 is further configured to store the real machine verification result.

In a possible implementation manner, the acquiring module 504 is further configured to:

acquire an update data package of a mini program and second configuration information of the update data package, the second configuration information is used to indicate a terminal parameter and/or application category adapted to the updated mini program;

the transmitting module 503 is further configured to transmit the update data package to a terminal that has been issued the mini program according to the second configuration information.

In a possible implementation manner, the processing module 502 is further configured to:

determine a first terminal which matches the update terminal parameter by comparing a terminal parameter of each terminal in historical issuance record with an updated terminal parameter indicated by the second configuration information;

the transmitting module 503 is specifically configured to transmit the update data package to the first terminal.

In a possible implementation manner, the processing module 502 is further configured to:

put a tag on the update data package if a terminal that has been issued the mini program does not match a terminal parameter adapted to the mini program, the tag is used to indicate that the terminal does not adapt to the mini program;

the transmitting module 503 is specifically configured to transmit the update data package including the tag to the terminal.

The mini program processing apparatus provided by the embodiment may be configured to execute the technical solution in any of the above method embodiments, and its implementation principle and technical effect are similar, and will not be repeated here.

According to an embodiment of the present application, the present application also provides an electronic device and a readable storage medium.

Figure 7:
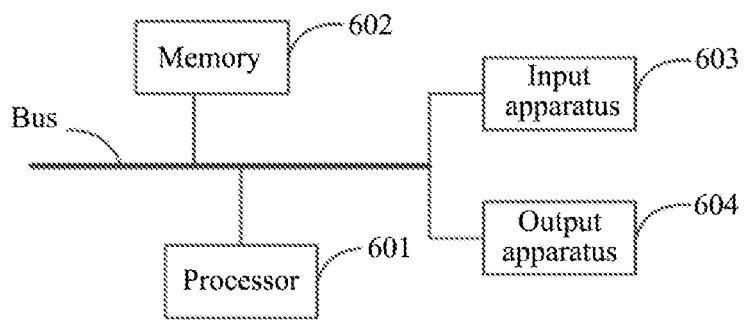
FIG. 7 is a schematic structural diagram of an electronic device provided by an embodiment of the present application.

As shown in FIG. 7, that is a block diagram of an electronic device according to the mini program processing method of an embodiment of the present application. The electronic devices are intended to represent various forms of digital computer, such as laptop computer, desktop computer, workstation, personal digital assistant, server, blade server, mainframe computer, and other suitable computers. The electronic devices may also represent various forms of mobile device, such as personal digital assistant, cellular phone, smart phone, wearable device, and other similar computing device. The components shown herein, their connections and relationships, and their functions are merely examples, and are not intended to limit the implementation of the present application described and/or required herein.

As shown in FIG. 7, the electronic device includes: one or more processors 601, a memory 602, and interfaces for connecting various components, including high-speed interfaces and low-speed interfaces. The various components are connected to each other by using different buses, and can be installed on a common motherboard or installed in other ways as required. The processor can process instructions executed in the electronic device, including instructions stored in or on the memory to display graphical information of the graphical user interface (GUI) on an external input/output apparatus (such as a display device coupled to an interface). In other embodiments, if necessary, multiple processors and/or multiple buses can be used with multiple memories. Similarly, multiple devices can be connected, and each device provides some necessary operations (for example, as a server array, a group of blade servers, or a multi-processor system). One processor 601 is taken as an example in FIG. 7.

The memory 602 is the non-transitory computer-readable storage medium provided by the present application. Where the memory stores instructions that can be executed by at least one processor, so that the at least one processor executes the method provided in the present application. The non-transitory computer-readable storage medium of the present application stores computer instructions that make the computer execute the method provided in the present application.

As a non-transitory computer-readable storage medium, the memory 602 can be used to store non-transitory software programs, non-transitory computer executable programs, and modules, such as program instructions/modules corresponding to the method for defending against attacks in the embodiment of the present application (e.g., the receiving module 501, the processing module 502, the transmitting module 503, the acquiring module 504, and the storing module 505 shown in FIG. 6). The processor 601 executes various functional applications and data processing of the cloud server by running non-transitory software programs, instructions, and modules that are stored in the memory, that is, implements the methods in the above method embodiments.

The memory 602 may include a program storage area and a data storage area, where the program storage area may store an operating system and an application program required by at least one function; the data storage area may store data generated by the utilization of the terminal device and/or server. Moreover, the memory 602 may include high-speed random access memory, or non-transitory memory, such as at least one magnetic disk storage device, flash memory device, or other non-transitory solid-state storage device. In some embodiments, the memory 602 may optionally include a memory remotely located relative to the processor 601, and these remote memories may be connected to the terminal device and/or the server through a network. Examples of the above networks include, but are not limited to, the Internet, corporate intranet, local area network, mobile communication network and combinations thereof.

The electronic device may further include: an input apparatus 603 and an output apparatus 604. The processor 601, the memory 602, the input apparatus 603, and the output apparatus 604 may be connected through a bus or other methods. In FIG. 7, the connection through a bus is taken as an example.

The input apparatus 603 may receive input digital or character information, and generate key signal input related to the user settings and function control of the terminal device and/or server, such as touch screen, keyboard, mouse, trackpad, touchpad, command stick, one or more mouse buttons, trackball, joystick and other input apparatuses. The output apparatus 604 may include a display device, an auxiliary lighting device (such as, LED), a tactile feedback device (such as, a vibration motor), etc. The display device may include, but is not limited to, liquid crystal display (LCD), light emitting diode (LED) display, and plasma display. In some embodiments, the display device may be a touch screen.

Various implementations of the systems and technologies described herein can be implemented in the digital electronic circuit system, integrated circuit system, application specific integrated circuit (ASIC), computer hardware, firmware, software, and/or combinations thereof. These various implementations may include: being implemented in one or more computer programs, where the one or more computer programs may be executed and/or interpreted on a programmable system including at least one programmable processor, the programmable processor can be an application specific or general-purpose programmable processor that can receive data and instructions from the storage system, at least one input apparatus, and at least one output apparatus, and send the data and instructions to the storage system, the at least one input apparatus, and the at least one output apparatus.

These computing programs (also referred to as programs, software, software applications, or codes) include machine instructions for programmable processors, and can be implemented by high-level procedures and/or object-oriented programming languages, and/or assembly/machine language. As used herein, the terms "machine-readable medium" and "computer-readable medium" refer to any computer program product, device, and/or apparatus (such as, magnetic disk, optical disk, memory, programmable logic device (PLD)) used to provide machine instructions and/or data to a programmable processor, including, machine-readable media that receive machine instructions used as machine-readable signals. The term "machine-readable signal" refers to any signal used to provide machine instructions and/or data to the programmable processor.

In order to provide interaction with the user, the system and technology described here can be implemented on a computer, where the computer is equipped with: a display apparatus for displaying information to the user (such as, CRT (cathode ray tube) or LCD (liquid crystal display) monitor); and keyboard and pointing apparatus (such as, mouse or trackball) through which the user can provide input to the computer. Other types of apparatuses can also be used to provide interaction with the user; for example, the feedback provided to the user can be any form of sensory feedback (such as, visual feedback, auditory feedback, or tactile feedback); and input from the user can be received in any form (including acoustic input, voice input, or tactile input).

The systems and technologies described here can be implemented in computing systems (such as, data server) that include back-end components, or in computing systems (such as, application server) that include middleware components, or in computing systems (such as, a user computer with a graphical user interface or a web browser through which the user can interact with the implementation of the system and technology described herein) that include front-end components, or in computing systems that include any combination of such background components, middleware components, or front-end components and any combination thereof. The components of the system can be connected to each other through digital data communication in any form or medium (e.g., communication network). Examples of communication networks include: local area network (LAN), wide area network (WAN), and the Internet.

The computer system may include a client and a server. The client and the server are generally far away from each other and usually interact through a communication network. The relationship between the client and the server is generated by running computer programs with client-server relationship on the corresponding computers.

An embodiment of the present application also provides a mini program processing method, including the following steps: receiving a query service request initiated by a user through a terminal, screening a first set of mini programs adapted to the terminal through the query service request; issuing the first set of mini programs to the terminal, the first set of mini programs includes at least one mini program adapted to the terminal. The specific implementation process of the embodiment, please refer to the records of the embodiments shown in FIGS. 2, 3, and 4, which will not be repeated here.

Through the technical solutions provided by the embodiments of the present application, a terminal user and a mini program developer are well connected to ensure that a mini program developed by the developer may be distributed in more channels and terminals. At the same time, it is also ensured that the mini program is timely, accurately and efficiently issued and updated according to specific scenario and terminal.

Through real machine simulation verification on the server side, manual screening operations by business personnel of each issuance terminal are saved, the distribution efficiency of the mini program is greatly improved.

The processing method provided by the embodiments of the present application can be used in terminal adaptive product distribution scenarios in the form of application APP, mini program, mini game, etc. Selecting the terminal or application scenario to put by a mini program data package and a configuration parameter information submitted and uploaded by a developer, to realize real-time update notifications, to ensure that new ecological products may be delivered to different terminals with high quality and efficiency, and to bring users a good usage experience of the mini program.

It should be understood that the various forms of processes shown above can be used to reorder, add or delete steps. For example, the steps described in the present application can be executed in parallel, sequentially, or out of order, as long as the desired result of the technical solution disclosed in the present disclosure can be achieved, which is not limited here.

The above specific implementations do not constitute a limitation on the scope of protection of the present application. Those skilled in the art should understand that various modifications, combinations, sub-combinations and substitutions can be made according to design requirements and other factors. Any modifications, equivalent substitutions and improvements made within the spirit and principles of the present application shall fall into the scope of protection of the present application.

What is claimed is:

1. A mini program processing method, comprising:
receiving a query service request initiated by a user through a terminal, wherein the query service request comprises at least one of the following: a terminal parameter or an application category;
screening a first set of mini programs adapted to the terminal through the query service request; and
issuing the first set of mini programs to the terminal, wherein the first set of mini programs comprises at least one mini program adapted to the terminal parameter or the application category;
wherein, before the issuing the first set of mini programs to the terminal, the mini program processing method further comprises:
acquiring a real machine verification result of each mini program in the first set of mini programs;
screening at least one mini program in the first set of mini programs that satisfies a preset verification condition from the first set of mini programs according to the real machine verification result; and
correspondingly, the issuing the first set of mini programs to the terminal comprises:
issuing the at least one mini program in the first set of mini programs that satisfies the preset verification condition to the terminal.

2. The mini program processing method according to claim 1, wherein the screening a first set of mini programs adapted to the terminal through the query service request comprises:
screening a first set of mini programs adapted to the terminal parameter of the terminal through the terminal parameter in the query service request; or
screening a first set of mini programs adapted to the application category of the terminal through the application category in the query service request; or
screening a candidate set of mini programs adapted to the terminal parameter of the terminal through the terminal parameter in the query service request, and screening a first set of mini programs adapted to the application category of the terminal from the candidate set of mini programs.

3. The mini program processing method according to claim 1, wherein, before the issuing the first set of mini programs to the terminal, the mini program processing method further comprises:
acquiring a historical operation status of each mini program in the first set of mini programs;
screening at least one mini program in the first set of mini programs that satisfies a preset operation status, from the first set of mini programs, according to the historical operation status of each mini program in the first set of mini programs; and
correspondingly, the issuing the first set of mini programs to the terminal comprises:
issuing the at least one mini program in the first set of mini programs that satisfies the preset operation status to the terminal.

4. The mini program processing method according to claim 3, wherein the acquiring a historical operation status of each mini program in the first set of mini programs comprises:
acquiring a historical operation status of each mini program in the first set of mini programs by querying a user behavior log of each mini program in the first set of mini programs in different terminals or different applications.

5. The mini program processing method according to claim 3, wherein the historical operation status of each mini program in the first set of mini programs is used to indicate at least one of a number of exception occurrence of a mini program, an average usage frequency of a mini program, and an average usage duration of a mini program; and
correspondingly, satisfying the preset operation status comprises at least one of the following:
the number of exception occurrence of the mini program is less than a first preset number of times;
the average usage frequency of the mini program is greater than or equal to a preset usage frequency; and the average usage duration of the mini program is greater than or equal to a preset usage duration.

6. The mini program processing method according to claim 1, wherein the real machine verification result of each mini program in the first set of mini programs is used to indicate at least one of a number of exception occurrence of a mini program and an average initiation duration of a mini program; and correspondingly, satisfying the preset verification condition comprises at least one of the following:

the number of exception occurrence of the mini program is less than a first preset number of times, and the average initiation duration of the mini program is less than a preset initiation duration.

7. The mini program processing method according to claim 1, wherein the terminal parameter comprises at least one of the following: type, model, screen size, resolution, aspect ratio adapted to a mini program, and supported function of the terminal.

8. The mini program processing method according to claim 7, wherein the supported function of the terminal comprises at least one of the following: Bluetooth function, global positioning system (GPS) function, video function, and audio function.

9. The mini program processing method according to claim 1, wherein the application category comprises any one of the following: social application, navigation application, wealth management application, shopping application, video application, game application, and photography application.

10. The mini program processing method according to claim 1, wherein, before the receiving a query service request initiated by a user through a terminal, the mini program processing method further comprises:

acquiring a mini program data package and first configuration information of the mini program data package, wherein the first configuration information of the mini program data package is used to indicate at least one of a terminal parameter and an application category adapted to a mini program; and storing the first configuration information of the mini program data package.

11. The mini program processing method according to claim 10, wherein, after the acquiring a mini program data package and first configuration information of the mini program data package, the mini program processing method further comprises:

acquiring a real machine verification result of the mini program in different terminals or different applications; and storing the real machine verification result of the mini program.

12. The mini program processing method according to claim 1, further comprising:

acquiring an update data package of a mini program and first configuration information of the update data package of the mini program, wherein the first configuration information of the update data package of the mini program is used to indicate at least one of a terminal parameter and an application category adapted to an updated mini program; and transmitting the update data package of the mini program to a terminal that has been issued the mini program according to the first configuration information of the update data package of the mini program.

13. The mini program processing method according to claim 12, wherein the transmitting the update data package of the mini program to a terminal that has been issued the mini program according to the first configuration information of the update data package of the mini program comprises:

determining, by comparing a terminal parameter of each terminal in historical issuance record with an updated terminal parameter indicated by the first configuration information of the update data package of the mini program, a first terminal which matches the updated terminal parameter; and transmitting the update data package of the mini program to the first terminal.

14. The mini program processing method according to claim 12, wherein the transmitting the update data package of the mini program to a terminal that has been issued the mini program according to the first configuration information of the update data package of the mini program comprises:

putting a tag on the update data package of the mini program if a terminal that has been issued the mini program does not match a terminal parameter adapted to the mini program, wherein the tag is used to indicate that the terminal does not adapt to the mini program; and transmitting the update data package of the mini program comprising the tag to the terminal.

15. A non-transitory computer-readable storage medium storing computer instructions, wherein the computer instructions are used to cause a computer execute the mini program processing method according to claim 1.

16. An electronic device, comprising:

at least one processor; and a memory communicatively connected with the at least one processor; wherein the memory stores instructions thereon, and the instructions, when executed by the at least one processor, enable the at least one processor to:

receive a query service request initiated by a user through a terminal, wherein the query service request comprises at least one of the following: a terminal parameter or an application category;

screen a first set of mini programs adapted to the terminal through the query service request; and issue the first set of mini programs to the terminal, wherein the first set of mini programs comprises at least one mini program adapted to the terminal parameter or the application category;

wherein, before the issuing the first set of mini programs to the terminal, the at least one processor is further configured to:

acquire a real machine verification result of each mini program in the first set of mini programs;

screen at least one mini program in the first set of mini programs that satisfies a preset verification condition from the first set of mini programs according to the real machine verification result; and correspondingly, the issuing the first set of mini programs to the terminal comprises:

issue the at least one mini program in the first set of mini programs that satisfies the preset verification condition to the terminal.

17. The electronic device according to claim 16, wherein the screening a first set of mini programs adapted to the terminal through the query service request comprises:

screen a first set of mini programs adapted to the terminal parameter of the terminal through the terminal parameter in the query service request; or screen a first set of mini programs adapted to the application category of the terminal through the application category in the query service request; or screen a candidate set of mini programs adapted to the terminal parameter of the terminal through the terminal parameter in the query service request, and screen a first set of mini programs adapted to the application category of the terminal from the candidate set of mini programs.

18. The electronic device according to claim 16, wherein, before the issuing the first set of mini programs to the terminal, the at least one processor is further configured to:

acquire a historical operation status of each mini program in the first set of mini programs;

screen at least one mini program in the first set of mini programs that satisfies a preset operation status, from the first set of mini programs, according to the historical operation status of each mini program in the first set of mini programs; and correspondingly, the issuing the first set of mini programs to the terminal comprises:

issue the at least one mini program in the first set of mini programs that satisfies the preset operation status to the terminal.

19. A mini program processing method, comprising:

receiving a query service request initiated by a user through a terminal;

screening a first set of mini programs adapted to the terminal through the query service request; and transmitting the first set of mini programs to the terminal, wherein the first set of mini programs comprises at least one mini program adapted to the terminal;

wherein, before the transmitting the first set of mini programs to the terminal, the mini program processing method further comprises:

acquiring a real machine verification result of each mini program in the first set of mini programs;

screening at least one mini program in the first set of mini programs that satisfies a preset verification condition from the first set of mini programs according to the real machine verification result; and correspondingly, the transmitting the first set of mini programs to the terminal comprises:

issuing the at least one mini program in the first set of mini programs that satisfies the preset verification condition to the terminal.

* * * * *